June 6, 1933.  C. F. GISEWHITE  1,912,978
TIRE CHAIN
Filed March 28, 1932
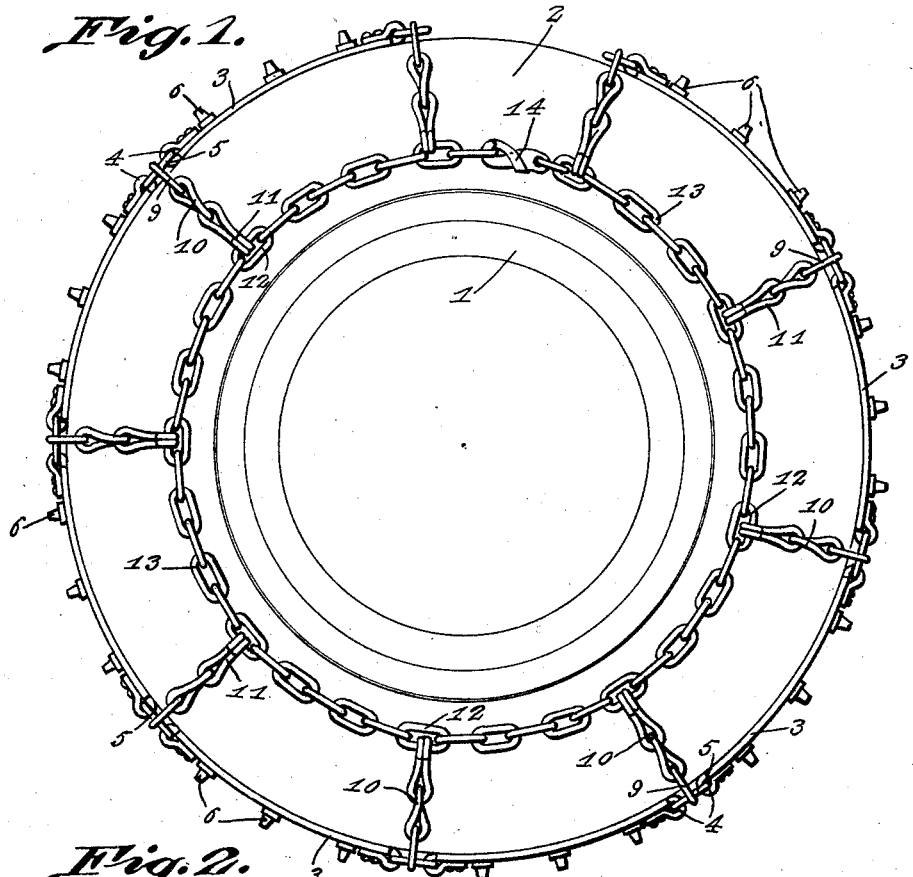
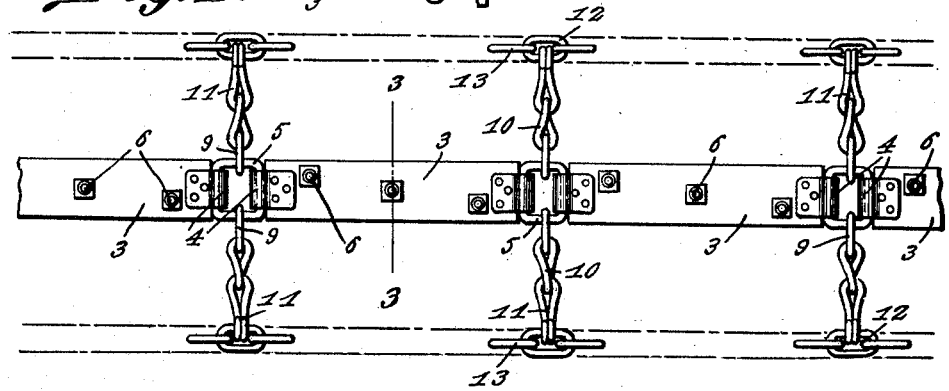

Patented June 6, 1933

1,912,978

UNITED STATES PATENT OFFICE

CHARLES F. GISEWHITE, OF MILROY, PENNSYLVANIA

TIRE CHAIN

Application filed March 28, 1932. Serial No. 601,678.

The object of this invention is the provision of a traction device for pneumatic tires of a construction which may be cheaply manufactured and commercialized but also of a construction whereby the device, when applied on the wheel, will eliminate both slippage and skidding.

A further object is the provision of an anti-skid chain in which the tread or surface contacting part is made up of calk carrying segmental plates hinged at their confronting ends and to which hinges there are secured the open ends of the cross chains, the outer end links of the said cross chains being also opened or hooked to engage with the links of the side chains, which latter are provided with the usual fasteners, and wherein the construction is such that when applied on the wheel the device is held from lateral or circumferential movement and which will insure perfect traction between the wheel and the roadbed.

To the attainment of the foregoing the invention consists in the improvement hereinafter described and definitely claimed.

In the drawing:

Figure 1 is a side elevation of the improvement in applied position.

Figure 2 is a fragmentary plan view thereof.

Figure 3 is a transverse sectional view on the line 3—3 of Figure 2.

In Figure 1 of the drawing, the numeral 1 designates an ordinary vehicle wheel that is provided with a pneumatic tire 2. Designed to be arranged around the outer periphery at the center of the tire 2 there is the intermediate element of my improvement. As disclosed by the drawing the element comprises a plurality of flat segmental plates 3 that have their confronting ends provided with eyes 4. The eyes 4 receive therethrough the hinged elements 5 which are in the nature of substantially rectangular links. The hinged elements 5 are of rectangular formation and arranged crosswise of the plates 3 and the side portions of the links engage in the eyes 4 defining the end portion of the links flush with the opposite longitudinal edges of the plates 3.

Each of the segmental plates 3 has fixedly secured thereon angularly disposed or staggeredly related calks 6 which are of tempered steel and which are substantially conical. As disclosed by Figure 3 of the drawing the body of each of the calks 6 has its inner and widened end formed with an annular extension from which centrally projects a stem 8 that passes through openings in the plates 3, the inner walls provided by the said openings being reamed and the stems or shanks 8 have their ends arranged in said reamed portions. The hinge elements 5 have attached to their sides the open or hooked ends of links 9 of oppositely directed short chains 10 and the outer end links of these chains are also provided with open hook links 11 to engage with certain links 12 in the side chains 13. The side chains are, of course, in the nature of split members that have the links at their confronting ends provided with the usual lock catches 14.

The segmental plates 3 are comparatively wide and, therefore, offer a broad tread surface. The hinge connection between the plates permits the independent yielding of each of said plates. The cross and side chains hold the plates 3 from either lateral or circumferential movement so that a firm and positive traction between the calks 6 on the plates 3 and the road surface is insured with a result that a vehicle equipped with the improvement will be sustained from slippage or from skidding.

Having described the invention, I claim:

An anti-skid chain for vehicle tires comprising a tread element constructed from a plurality of flat, wide and segmental plates, staggeredly related calks projecting from each of the plates, eyes riveted to the confronting ends of the plates, substantially rectangular links of a length equaling the transverse width of the said plates passing lengthwise through the eyes with the side portions thereof contacting with the confronting ends of the plates and hingedly connecting said plates and retaining the latter equally spaced, short cross chains having open links, the inner end links being connected to the ends of the hinged links for the plates, side chains to which the outer end links of the cross chains are connected, and fastening means for connecting the confronting end links of the side chains.

In testimony whereof I affix my signature.

CHARLES F. GISEWHITE.